US009954438B2

(12) United States Patent
Tomasovics et al.

(10) Patent No.: US 9,954,438 B2
(45) Date of Patent: Apr. 24, 2018

(54) ELECTRONIC CONTROLLER WITH AUTOMATIC ADJUSTMENT TO UNKNOWN INPUT AND LOAD VOLTAGES

(71) Applicant: Infineon Technologies AG, Neubiberg (DE)

(72) Inventors: Attila Tomasovics, Munich (DE); Muhammad Nur Syafii Mohamed Saat, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 82 days.

(21) Appl. No.: 14/879,978

(22) Filed: Oct. 9, 2015

(65) Prior Publication Data

US 2017/0104411 A1    Apr. 13, 2017

(51) Int. Cl.
*G05F 1/00* (2006.01)
*H02M 3/157* (2006.01)
*H02M 1/44* (2007.01)
*H02M 3/335* (2006.01)

(52) U.S. Cl.
CPC .............. *H02M 3/157* (2013.01); *H02M 1/44* (2013.01); *H02M 3/33507* (2013.01)

(58) Field of Classification Search
CPC .... H02M 3/156; H02M 3/158; H02M 3/1588; H02M 2003/1566; H02M 3/155; H02M 3/1582; H02M 2003/1557; H02M 3/157; H02M 2001/0012; H04B 2215/069
See application file for complete search history.

(56) References Cited

U.S. PATENT DOCUMENTS

| 9,125,250 | B1* | 9/2015 | Xiong | H02M 3/156 |
| 2009/0206775 | A1 | 8/2009 | Green et al. | |
| 2011/0089855 | A1 | 4/2011 | Roberts et al. | |
| 2012/0299503 | A1 | 11/2012 | Aharon | |
| 2013/0181635 | A1 | 7/2013 | Ling | |
| 2015/0331436 | A1 | 11/2015 | Vonach | |

FOREIGN PATENT DOCUMENTS

| CN | 102598859 A1 | 7/2012 |
| DE | 102012008499 A1 | 10/2013 |

OTHER PUBLICATIONS

Office Action, in the German language, from counterpart German Application No. 102016118951.0, dated Nov. 21, 2016, 10 pages.
"XMC1200 Microcontroller Series for Industrial Applications," Infineon, Board Manual V1.0, Nov. 2014, 58 pp.

(Continued)

*Primary Examiner* — Adolf Berhane
*Assistant Examiner* — Afework Demisse
(74) *Attorney, Agent, or Firm* — Shumaker & Sieffert, P.A.

(57) ABSTRACT

Methods, devices, techniques, and circuits are disclosed for current control of a buck converter. In one example, a device is configured to receive a selected average current value for a current driver. The device is further configured to determine a set of parameters for the current driver. The device is further configured to generate an output to the current driver to cause the current driver to output a switching signal with an average current that corresponds to the selected average current value.

17 Claims, 6 Drawing Sheets

(56) References Cited

OTHER PUBLICATIONS

"STEVAL385LED4CH: four independent high brightness LED channels using the STLUX385A digital controller," STMicroelectronics, AN4291 Application Note, Jun. 2013, 53 pp.
"RL78/I1A DC/DC LED Control Evaluation Board (EZ-0012), 16-bit Microcontroller," Renesas Electronics, User's Manual: Hardware, Rev 2.00, Sep. 2012, 65 pp.
"PowerPSoC® Embedded Power Controller," Cypress, Product Overview, 2013, 2 pp. (Applicant points out that, in accordance with MPEP 609.04(a), the 2013 year of publication is sufficiently earlier than the effective U.S. filing date and any foreign priority date of Oct. 9, 2015 so that the particular month of publication is not in issue.).
"32F3348DISCOVERY, Discovery kit for STM32F334 line," STMicroelectronics, Data brief, Nov. 2014, 4 pp.
Office Action, in Chinese, from counterpart Chinese Patent Application No. 201610832437.0, dated Dec. 11, 2017, 7 pp.

\* cited by examiner

US 9,954,438 B2

ELECTRONIC CONTROLLER WITH AUTOMATIC ADJUSTMENT TO UNKNOWN INPUT AND LOAD VOLTAGES

TECHNICAL FIELD

This disclosure relates to electrical power converters, and in particular, to electronic controls for electrical power converters.

BACKGROUND

Electrical power converters are used to meet specialized current and voltage requirements of a load with the available source power. For example, chains of light-emitting diodes (LEDs) may require a certain DC voltage and current for proper operation. LED chains may typically be powered with two-stage control gear including an AC-DC voltage converter and a DC-DC current converter, typically a step-down or buck converter with a lower output voltage than input voltage.

An LED chain controller may be either analog or digital. An analog controller causes the illumination to be proportional to the current, which has the advantages of simplicity and fast response time. However, the response of illumination to current is non-linear, and the frequency spectrum of the illumination also varies with current, causing the color of the light to change with the brightness. Digital DC-DC current converter controllers are thus preferred for many applications.

SUMMARY

Various examples of this disclosure are directed to techniques, systems, devices, and methods for an electronic driver to automatically generate a desired average output current regardless of the input voltage and regardless of the load voltage, across a wide range of normal operating conditions, and to do so with a small ripple current. A driver of this disclosure may achieve these advantages with control logic alone rather than using additional expensive and bulky components beyond existing, inexpensive and compact driver hardware. A driver of this disclosure may receive an input indicating a target average current; measure the load voltage and the input voltage; and determine and implement a reference current and an off-time to drive a switching signal to implement the target average current, with low ripple, based on the target average current, the input voltage, and the load voltage.

A driver of this disclosure may thus, for example, drive an LED chain with a reliable and efficient current flow, with rapid turn-on time, nominal brightness and color, absence of flicker, and protection against overcurrent failure, among other advantages, for any of a wide range of input voltages and any of a wide range of load voltages automatically rather than requiring the input voltage or load voltage to be programmed into the driver. A single driver of this disclosure may thus be used flexibly, reliably, and efficiently across a wide range of applications and operating conditions.

One example is directed to a device. The device is configured to receive a selected average current value for a current driver. The device is further configured to determine a set of parameters for the current driver. The device is further configured to generate an output to the current driver to cause the current driver to output a switching signal with an average current that corresponds to the selected average current value.

Another example is directed to a method. The method includes receiving a selected average current value for a current driver. The method further includes determining a set of parameters for the current driver. The method further includes generating an output to the current driver to cause the current driver to output a switching signal with an average current that corresponds to the selected average current value.

Another example is directed to a microcontroller. The microcontroller includes a pulse density modulator, an analog comparator, a current control circuit, and a logic control unit. The current control circuit has an input connected to an output of the pulse density modulator and to an output of the analog comparator. The logic control unit is configured with a peak current set-point output connected to an input of the analog comparator, and with an off-time output connected to an input of the current control unit.

The details of one or more examples of this disclosure are set forth in the accompanying drawings and the description below. Other features, objects, and advantages will be apparent from the description and drawings, and from the claims.

DETAILED DESCRIPTION

Figure 1:
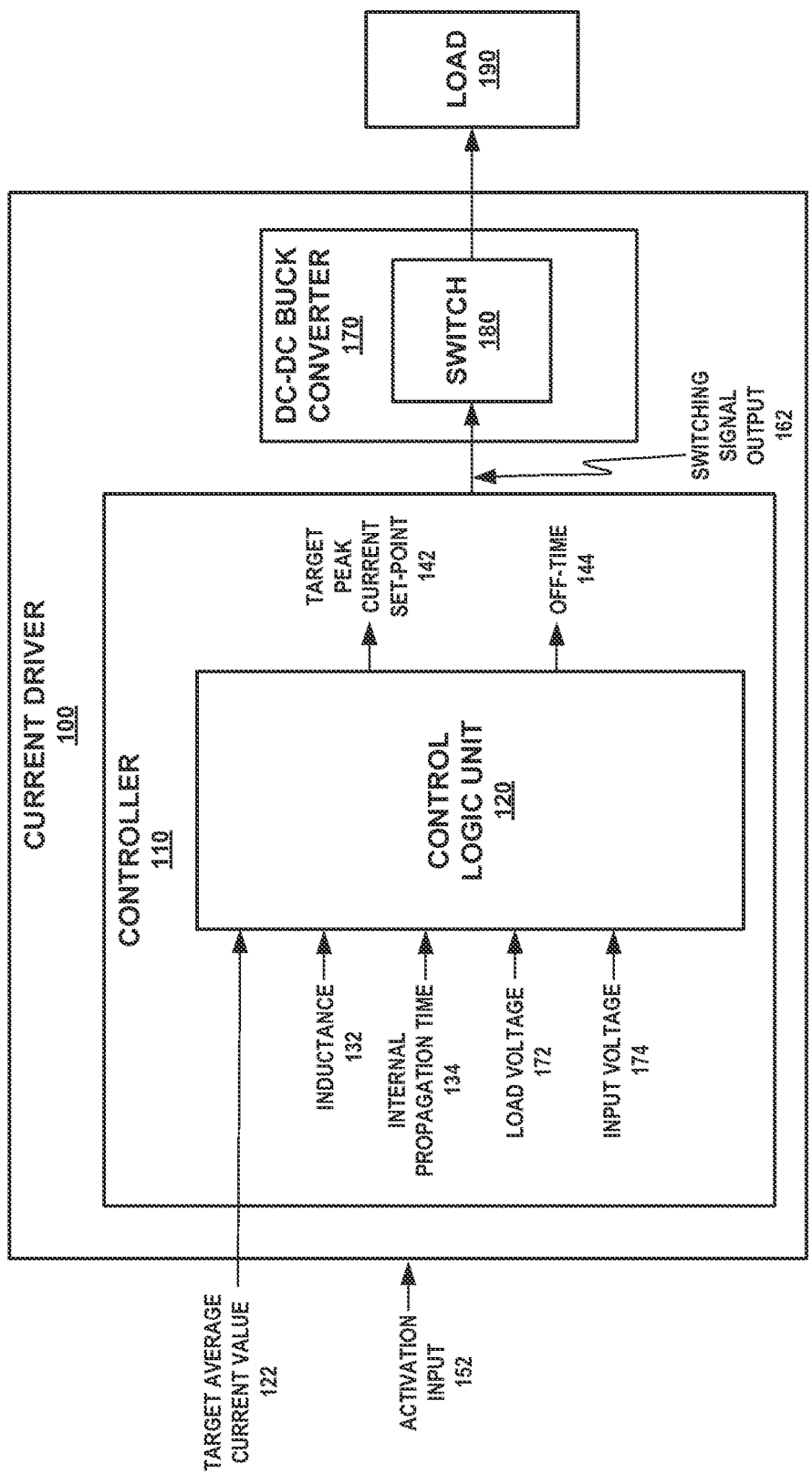
FIG. 1 depicts a conceptual block diagram of a current driver and a load, the current driver comprising a controller and a DC-DC buck converter, the controller comprising a control logic unit, and the DC-DC buck converter comprising a switch, with inputs to and outputs from the control logic unit to control the switch and drive the load, in one example of this disclosure.

FIG. 1 depicts a conceptual block diagram of a current driver 100 and a load 190, the current driver 100 comprising a controller 110 and a DC-DC buck converter 170, the controller 110 comprising a control logic unit 120, and the DC-DC buck converter 170 comprising a switch 180, with inputs to and outputs from the control logic unit 120 to control the switch 180 and drive the load 190, in one example of this disclosure. Control logic unit 120 may be a central processing unit (CPU) programmed with executable control logic instructions, or may be a logic hardware element such as a field-programmable gate array (FPGA) or an application-specific integrated circuit (ASIC), in various examples. Load 190 may, for example, be a chain of LED lights. Control logic unit 120 is configured to receive an external input for a target average current value (Itarget) 122. Control logic unit 120 is also configured to determine internal parameters and to measure internal voltages of current driver 100, including internal parameters of an inductance (L) 132 in DC-DC buck converter 170 and an internal propagation time (Tprop) 134 in current driver 100, and measurements of a load voltage (VL) 172 and an input voltage (Vin) 174 in DC-DC buck converter 170. Control logic unit 120 may receive the input of the input of target average current value (Itarget) 122 from a user or other outside source seeking to configure current driver 100 to drive load 190. Control logic unit 120 may use the externally supplied input of target average current value (Itarget) 122 and the internally determined parameters and measurements of inductance (L) 132, internal propagation time (Tprop) 134, load voltage (VL) 172, and input voltage (Vin) 174 to determine and output, to other elements of controller 110 (as further explained below), a target peak current set-point (Iref) 142 and an off-time (Toff) 144. Control logic unit 120 may thereby cause controller 110 to supply an output current 182 to load 190 at an average current conforming to the target average current value 122.

Other components of controller 110 may receive target peak current setpoint (Iref) 142 and off-time (Toff) 144 as inputs from control logic unit 120. Controller 110 may also receive, at times, an activation input 152, intended to activate the load 190. For example, load 190 may be an LED chain, and activation input 152 may be a signal to turn on the LED chain and to control the brightness of the LED chain. Controller 110 may generate a switching signal output 162 to control switch 180 to switch on and off, thereby supplying switched output current 182 at the target average current value 122 to load 190.

Current driver 100 may thus automatically generate a switched output current 182 at an average current conforming to a target average current value 122 regardless of the input voltage 174 and regardless of a load voltage of load 190, across a wide range of normal operating conditions, and may do so with a small ripple current. Current driver 100 may achieve these advantages with control logic unit 120 alone rather than using additional expensive and bulky components beyond existing, inexpensive and compact driver hardware. Current driver 100 may drive load 190, such as an LED chain, with a reliable and efficient current flow, with rapid turn-on time, nominal brightness and color, absence of flicker, and protection against overcurrent failure, among other advantages, for any of a wide range of input voltages 174 and any of a wide range of load voltages automatically, rather than requiring the input voltage 174 or the load voltage to be programmed into the driver 100. A single driver 100 of this disclosure may thus be used flexibly, reliably, and efficiently across a wide range of applications and operating conditions.

An illustrative implementation of the example of FIG. 1 is described below in further detail with reference to FIG. 2. Other variations and implementations may be used in other examples.

Figure 2:
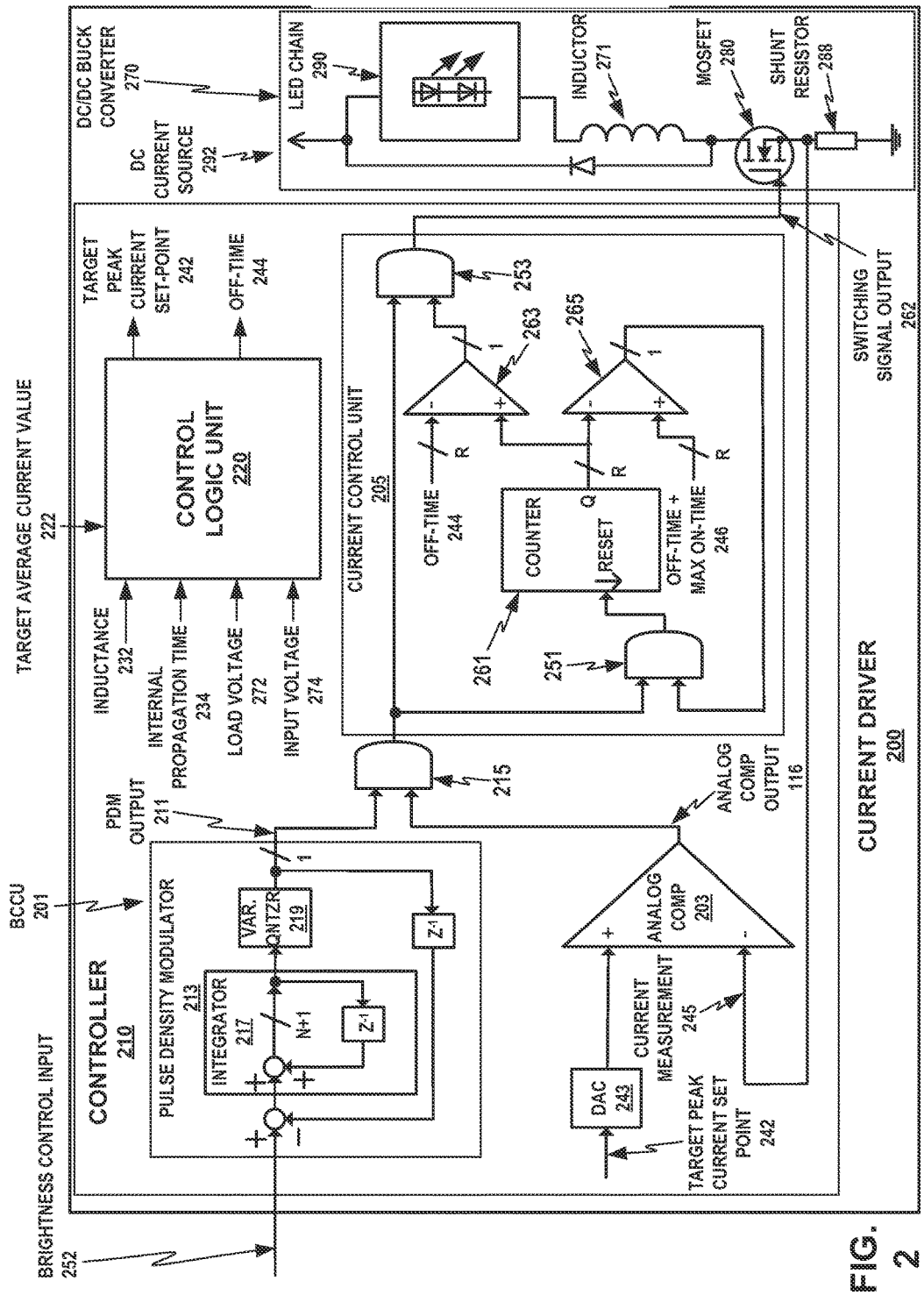
FIG. 2 depicts a circuit block diagram illustrating a current driver comprising a controller with a control logic unit and configured for automatically setting average output current via a metal-oxide semiconductor field effect transistor (MOSFET) of a DC-DC buck converter to a load LED chain, in accordance with an example of this disclosure.

FIG. 2 depicts a circuit block diagram illustrating a current driver 200 comprising a controller 210 with a control logic unit 220 and configured for automatically setting average output current via metal-oxide semiconductor field effect transistor (MOSFET) 280 of DC-DC buck converter 270 to a load LED chain 290, in accordance with an example of this disclosure. The example of FIG. 2 may be a more detailed depiction of an example implementation of current driver 100 of FIG. 1. Controller 210 includes a brightness and color control unit (BCCU) 201, an analog comparator 203, a current control unit (CCU) 205, and control logic unit 220, in this example. BCCU 201 includes a brightness control input terminal 252, a pulse density modulator (PDM) 213, and a BCCU output AND gate 215.

Control logic unit 220 is configured to receive an external input for a target average current value 222. Control logic unit 220 is also configured to receive internal parameters of inductance (L) 232 of inductor 271 comprised in DC-DC buck converter 270, and an internal propagation time (Tprop) 234 in current driver 200, and to receive measurements of forward load voltage (VL) 272 of LED chain 290 and input voltage (Vin) 274 of DC current source 292 of DC-DC buck converter 270. Control logic unit 220 may use the externally supplied input of target average current value (Itarget) 222 and the internally determined parameters and measurements of inductance (L) 232, internal propagation time (Tprop) 234, forward load voltage (VL) 272, and input voltage (Vin) 274 to determine and output, to other elements of controller 210, a target peak current setpoint (Iref) 242 and an off-time (Toff) 244, as further described below.

Internal propagation time (Tprop) 234 and inductance (L) 232 are parameters inherent to the system of driver 200 that control logic unit 220 or another component may measure once, and which may remain unchanging. Control logic unit 220 or another component may measure the forward load voltage (VL) 272 and the input voltage (Vin) 274 from buck converter 270 at a time when MOSFET 280 is switched on, such as soon after MOSFET 280 is initially switched on, for example. Control logic unit 220 or other component may measure the forward load voltage (VL) 272 and the input voltage (Vin) 274 repeatedly over time, such as soon after each time current driver 200 is initially activated, for example, which may enable updated calibration based on current values of voltages present in buck converter 270.

In examples in which another component measures or determines any of the values of internal propagation time (Tprop) 234, inductance (L) 232, forward load voltage (VL) 272, and/or input voltage (Vin) 274, the other component may then output those values to control logic unit 220. The measurements or inputs for the values of internal propagation time (Tprop) 234, inductance (L) 232, forward load voltage (VL) 272, and/or input voltage (Vin) 274 may pass through analog-to-digital (DAC) channels before being inputted to control logic unit 220. Control logic unit 220 may, by outputting target peak current setpoint (Iref) 242 and off-time (Toff) 244 to other elements of controller 210, cause a switching signal output via switching signal output terminal 262 to MOSFET 280, as further described below.

In particular, control logic unit 220 may output target peak current setpoint (Iref) 242 via a digital-to-analog converter (DAC) 243 to the non-inverting input terminal of analog comparator 203, and off-time 244 is outputted from control logic unit 220 to various inputs of current control unit 205, as further described below. Control logic unit 220 may determine target peak current set point 242 and off-time 244 to cause switching signal output terminal 262 to MOSFET 280 to implement an average current through LED chain 290 in accordance with the target average current value 222 inputted to control logic unit 220.

Target peak current set point 242 may thus be supplied to analog comparator 203 from control logic unit 220 instead of being manually set or set by exterior input. The other, inverting input to analog comparator 203 is connected to current measurement line 245 which is connected between MOSFET 280 and shunt resistor 288 of buck converter 270, and thereby indicates the current through MOSFET 280.

Brightness control input line 252 may be connected to a user input interface enabling a user to activate and select a brightness of the light of LED chain 290. Pulse density modulator 102 includes an integrator 217 and a quantizer 219 as shown in FIG. 2, and may output current pulses of constant width and of density over time in a pulse density modulated output bitstream via PDM output terminal 211 that varies in response to selected brightness input via brightness control input line 252. The pulse density modulated output bitstream outputted by PDM 213 and the analog comparator output from analog comparator 203 are both connected as inputs to BCCU AND gate 215. The output of BCCU AND gate 215 is inputted to current control unit 205.

Current control circuit 205 includes AND gates 251 and 253; counter 261; off-time input line 244; off-time and maximum on-time input line 246; and comparators 263 and 265. The output of BCCU AND gate 215 and of comparator 265 are connected as inputs to AND gate 251. The output of AND gate 251 is connected to the reset input of counter 261. The output of counter 261 is connected to the non-inverting input of comparator 263 and to the inverting input of comparator 265. The output of BCCU AND gate 215 and of comparator 263 are connected as inputs to AND gate 253.

The off-time output 244 from control logic unit 220 is connected to the inverting input of comparator 263. The off-time output 244 from control logic unit 220 is also combined with a signal for a maximum on-time to generate an off-time plus maximum on-time output 246 indicating a sum of the off-time 244 plus the maximum on-time. The maximum on-time may be selected generically and significantly outside a nominal operating range, as a safeguard against excessive on-time and overcurrent failure, for example. The off-time plus maximum on-time output 246 may be connected to the non-inverting input of comparator 265.

The output of AND gate 253 thus acts as the output of current control unit 205 and as the output of controller 210 as a whole, as switching signal output 262 as shown in FIG. 2, which controls the switching of MOSFET 280 in this example. MOSFET 280 controls turning the current through buck converter 270 on and off to LED chain 290. With MOSFET 280 on, the current through LED chain 290 and inductor 271 rises, at a rate of increase limited by inductor 271. When a selected brightness signal is inputted to current driver 200 via brightness control input 252, pulse density modulator 213 converts the brightness control input to a bit stream with a high rate of oscillation. This bit stream is an on-off signal that contains ON and OFF pulses. ON pulses may be considered equivalent to a 1 or a high bit in the bitstream, and OFF pulses may be considered equivalent to a 0 or a low bit in the bitstream. When this pulse density modulated output bit stream changes from 0 to 1 (ON pulse starting), current controller 200 initially turns MOSFET 280 on, and current rises through LED chain 290 and inductor 271 linearly and proportionately to input voltage.

The voltage also rises between MOSFET 280 and shunt resistor 288, which propagates via current measurement signal 245 to analog comparator 203. Analog comparator 203 thus responds to current measurement signal 245 exceeding the peak current reference set by control logic unit 220 via target peak current set point terminal 242 by generating an output that turns high signal switching output 262 off and turns MOSFET 280 off. With MOSFET 280 off, the current through LED chain 290 and inductor 271 declines, at a rate of decrease limited by inductor 271. The decrease in current is linear and proportional to the forward voltage of LED chain 290. Switching signal output 262 may remain off for a fixed off time governed by a fixed off-time output 244 provided by control logic unit 220 to comparator 263 of current control unit 205. After the set off-time, current controller 200 turns switching output 262 back on again.

Current controller 100 may thus alternate switching output 262 on and off at a high rate, keeping the current through LED chain 290 and inductor 271 set to the target average output current, and oscillating at a high rate within a tightly constrained range with small ripple current, as described further below. Detecting of the current measurement 245 through MOSFET 280 hitting the target peak current set point 242 is thus performed by analog comparator 203 which may have very fast detection time, and the off signal triggered by this detection may only need to propagate through a series of two AND gates 215 and 253 to MOSFET 280, which may provide very fast propagation time. Current controller 200 may thus provide both very low detection delay and very low propagation delay in controlling MOSFET 280 to turn on and off with reference to the target peak current set point 242 set by control logic unit 220 based on the input target average current value 222, and thus provide LED chain 290 current switching that is very fast and precisely referenced at an average current conforming to the target average current value 222.

Current driver 200 may thus automatically generate a switched output current at an average current conforming to a target average current value 222 regardless of the input voltage 274 and regardless of a load voltage 272 of LED chain 290, across a wide range of normal operating conditions, and with a small ripple current. Current driver 200 may drive LED chain 290 with a reliable and efficient current flow, with rapid turn-on time, nominal brightness and color, absence of flicker, and protection against overcurrent failure, among other advantages, for any of a wide range of input voltages 274 and any of a wide range of load voltages 272 automatically rather than requiring the input voltage 274 or load voltage 272 to be programmed into the driver. A single driver 200 of this disclosure may thus be used flexibly, reliably, and efficiently across a wide range of applications and operating conditions.

Control logic unit 220 may use a variety of methods to determine target peak current set-point 242 and off-time 244 based in part on target average current value 222 to cause signal switching output 262. Examples of these methods are further described below with reference to FIGS. 3-6.

Figure 3:
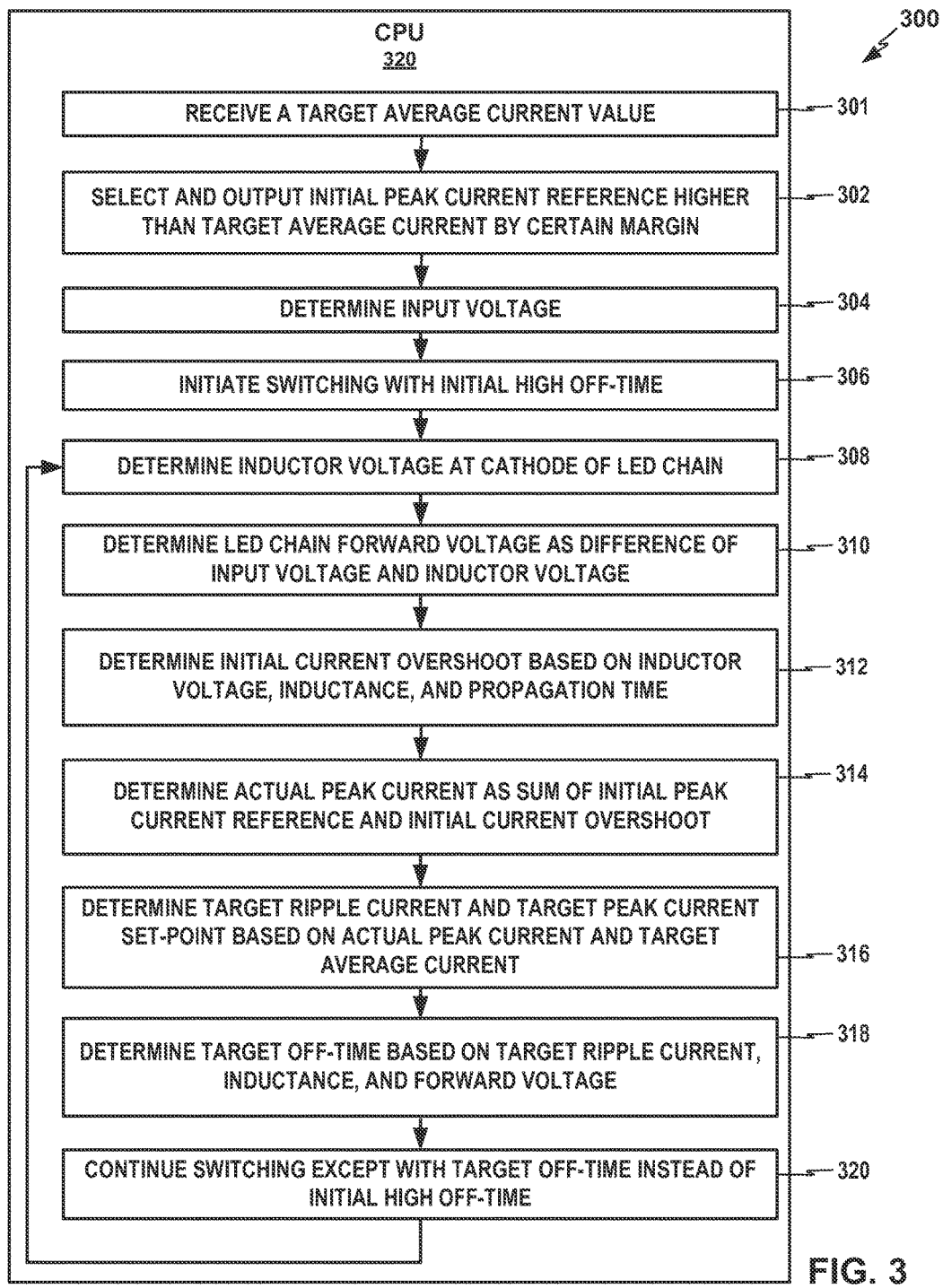
FIG. 3 depicts a flowchart for a process that may be implemented or executed by at least one central processing unit (CPU) of a current controller for automatically setting a target peak current set-point and a target off-time to implement a target average output current, in accordance with an example of this disclosure.

FIG. 3 depicts a flowchart for a process 300 that may be implemented or executed by at least one central processing unit (CPU) 320 of a current controller for automatically setting a target peak current set-point and a target off-time to implement a target average output current, in accordance with an example of this disclosure. Process 300 may be implemented or executed by one or more processors, such as one or more of CPU 320, configured to implement control logic unit 120 or 220 of current driver 100 or 200 as described above with reference to FIGS. 1 and 2. CPU 320 or other one or more processors may be configured to execute process 200 by being operably connected to memory and/or data storage that may have executable software code instructions stored thereon that implement process 300. CPU 320 may receive values for target average current value 222, internal propagation time (Tprop) 234, inductance (L) 232, forward load voltage (VL) 272, and/or input voltage (Vin) 274 from other elements of a current driver as described above. Process 300 is further described below with reference both to FIG. 3 and to elements of the example of FIG. 2.

CPU 320 may receive a target average output current (301). CPU 320 executing process 300 may select and output an initial peak current reference (Iref) that may be higher than the target average current value 222 by a certain or selected margin (302). The margin used may be based on a target ripple value, e.g., of 10-20%, and the internal propagation delays in the current driver. For example, CPU 320 may apply a margin of 5%, or a similar value (e.g., between 1% and 10% in some examples). This initial peak reference may be higher than a subsequent target peak current set-point 242 as described above. In one illustrative example, CPU 320 may receive a value of 700 milliamps for target average current 222, and CPU 320 may select an initial peak current reference of 730 milliamps. The initial peak current reference may generate an initial off-time that is higher than a subsequently determined target off-time, but may also protect against runaway current increase and overcurrent failure, in some examples. CPU 320 may output the high initial peak current reference to the non-inverting input of analog comparator 203 in the example of FIG. 2. CPU 320 may also measure the high initial peak current reference, and potentially apply feedback or other control, to ensure its accuracy.

CPU 320 may then measure, or receive a measurement of, the input voltage (Vin) (304), e.g., at DC current source 292 in FIG. 2. (CPU 320 may be said to measure the input voltage or any other value by way of another element of current driver 300 providing a measurement of the value to CPU 320, in some examples; CPU 320 may be said to measure or determine any value with the understanding that this may include CPU 320 receiving a measurement or determination of such value, for purposes herein.) CPU 320 may then initiate switching with an initially high generated off-time (high Tgen,off) that is higher than the later target off-time 244 as described above (306). This initially and temporarily high peak current reference and initially and temporarily high off-time may result in an initially and temporarily high ripple current. The initiated switching may enable CPU 320 to measure the voltage of LED chain 290, which is only measurable when MOSFET 280 is turned on.

CPU 320 may then measure the inductor voltage at the cathode of the LED chain 290 (or between LED chain 290 and inductor 271) (VL,ON) (310). CPU 320 may then calculate or determine the LED chain forward voltage (VF) as the difference between the input voltage and the inductor voltage (310):

$$V_F = V_{in} - V_{L,ON}$$

CPU 320 may then calculate or determine the initial current overshoot, e.g., how much the reference is overshot (Iovershoot), based on the inductor voltage, the inductance, and the propagation time (312):

$$I_{overshoot} = \frac{V_{L,ON}}{L} \times T_{propagation}$$

CPU 320 may then calculate or determine the actual peak current (Ipeak) as the sum of the initial peak current reference and the initial current overshoot (314):

$$I_{peak} = I_{ref} + I_{overshoot}$$

CPU 320 may then calculate or determine a target ripple current (Iripple,target) based on the actual peak current and the target average current 222, e.g., as the difference between the actual peak current and the target average current 222, times 2 (316):

$$i_{ripple,target} (i_{peak} - i_{avg,target}) \times 2$$

CPU 320 may also determine the target peak current set-point 242 as the target average current 222 plus one-half the target ripple current. The target peak current set-point 242 may be the same as or less than the earlier peak current in various examples. The average current is the actual peak current minus half the ripple current, or equivalently, halfway between the actual peak current and the actual valley current.

CPU 320 may then calculate or determine the target off-time 244 to be generated (Tgen,off) (318):

$$T_{gen,off} = \frac{i_{ripple,target} \times L}{V_F}$$

CPU 320 may then continue switching with this new target off-time 244 instead of applying the initial and temporary high off-time (320). By doing so, CPU 320 may supply the target average current with a substantially smaller ripple current than initially. In some examples, CPU 320 may then measure the input voltage (Vin) again (304) and measure the inductor voltage again (308), and repeat the remainder of process 300 from measuring the inductor voltage (308), to continue refining or re-calibrating the target peak current reference 242 and target off-time 244 over time, which may enable further reducing the ripple current, and settling on an output at the target average current with substantially low ripple current.

Thus in some examples, CPU 320 may execute an algorithm for process 320 and thereby implement control logic unit 120, 220 as discussed above, based on voltage measurements and calculations, and thereby generate an off-time and a peak current reference for a peak-current control LED driver system with unknown input voltage and unknown LED string voltage. The user may only need to set the target average current. CPU 320 may not require any other externally supplied parameters.

Figure 4:
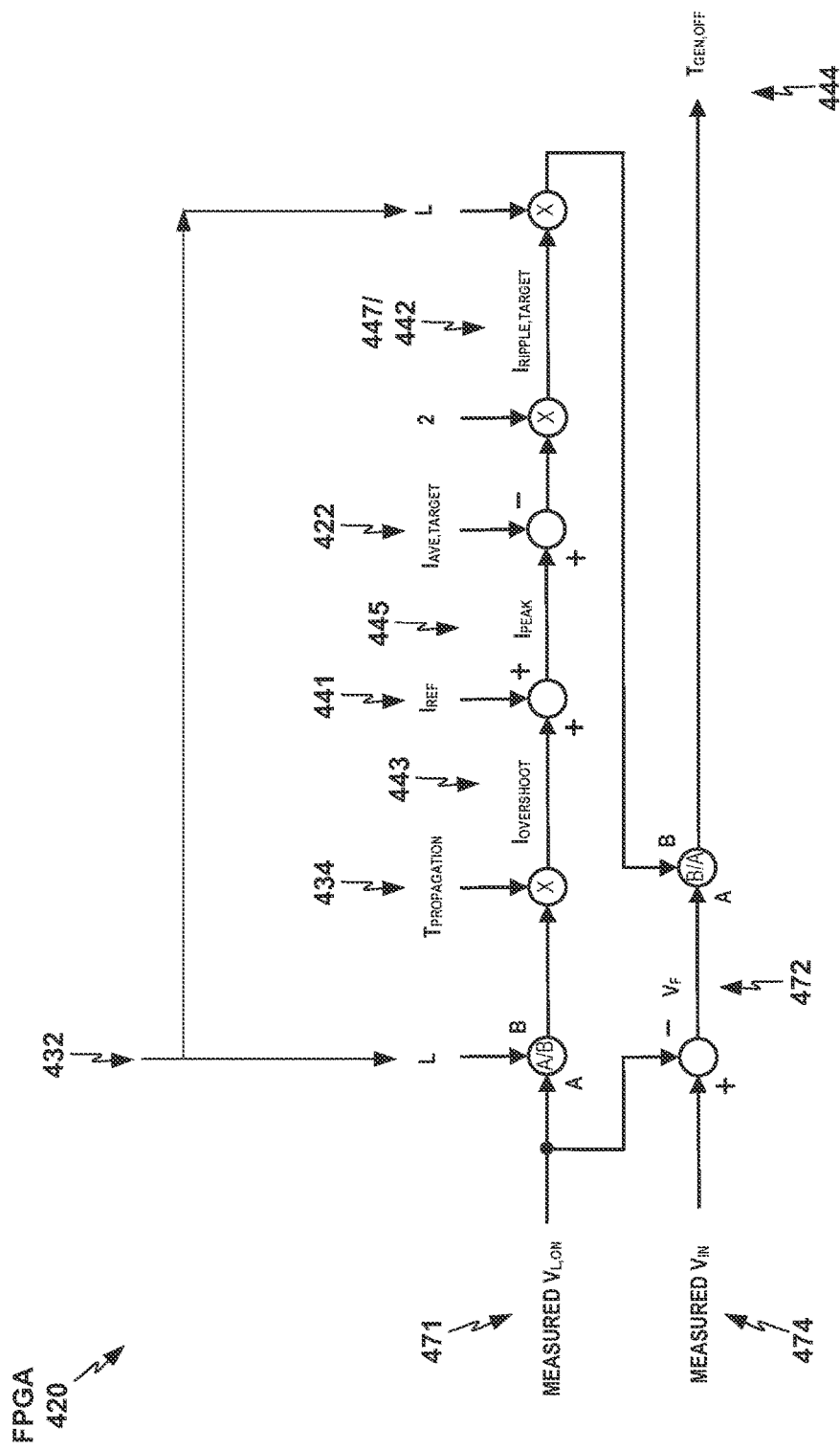
FIG. 4 depicts a functional block diagram for a hardware logic unit of a current controller for automatically setting average output current based on a selected average output current and a measured input voltage and load voltage, in accordance with an example of this disclosure.

FIG. 4 depicts a functional block diagram for a hardware logic unit 420 of a current controller 110 for automatically setting average output current based on a selected average output current and a measured input voltage and load voltage, in accordance with an example of this disclosure. Hardware logic unit 420 may be an ASIC, an FPGA, or any other type of special-purpose logic-encoding hardware, in contrast to the example of FIG. 3 of general-purpose processing hardware executing instruction code.

FIG. 4 depicts a functional block diagram of an FPGA 420 that may function as a control logic unit of a current controller for automatically setting a target peak current set-point and a target off-time to implement a target average output current, in accordance with another example of this disclosure. FPGA 420 may implement at least partially analogous functionality as described above with reference to one or more of control logic units 120, 220 and CPU 320. FPGA receives measured values of inductor voltage 471, input voltage 474, inductance 432, internal propagation time 434, initial peak current reference 441, and target average current 422, as shown in FIG. 4. FPGA 420 may determine, analogously with the corresponding descriptions above and as shown in FIG. 4, forward load voltage 472 based on inductor voltage 471 and input voltage 474; overshoot current 443 based on inductor voltage 471, inductance 432, and internal propagation time 434; peak current 445 based on overshoot current 443 and initial peak current reference 441; target ripple current 447 and/or target peak current set point 442 based on peak current 445 and target average current 422 (and a factor of 2); and target off-time 444 based on target ripple current 447 and/or target peak current set point 442, inductance 432, and forward load voltage 472.

Figure 5:
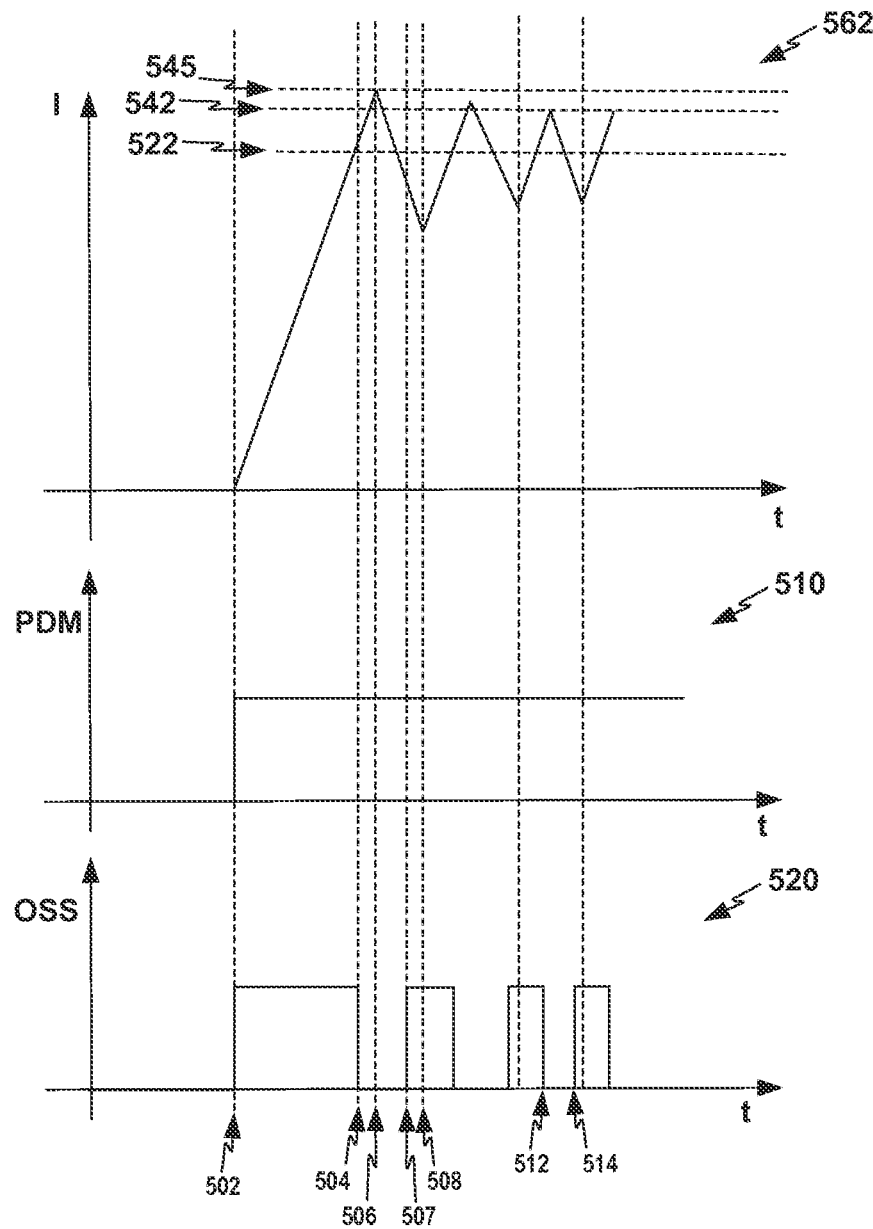
FIG. 5 depicts time-aligned graphs of a pulse density modulation (PDM) output bitstream signal graph, a controller output switching signal (OSS) graph, and an output current graph (e.g., outputted to an LED chain) of a current driver under control of a control logic unit configured to automatically set the average output current, in accordance with an example of this disclosure.

FIG. 5 depicts time-aligned graphs of a pulse density modulation (PDM) output bitstream signal graph 510, a controller output switching signal (OSS) graph 520, and an output current graph 562 (e.g., outputted to an LED chain) of a current driver under control of a control logic unit configured to automatically set the average output current, in accordance with an example of this disclosure. FIG. 5 shows example currents that may be applicable to the corresponding features of current drivers 100 or 200 under control of any of control logic units 120 and 220, CPU 320, or FPGA 420 as described above. Along the time axis, FIG. 5 illustratively shows initial current on-time 502, initial switch-off time 504, initial peak current at time 506 (after propagation delay), new on-signal time 507, and initial valley current at time 508. Along the current axis (y-axis) of output current graph 562, FIG. 5 shows a target average current value 522, an initial peak current value 545, and a target peak current set-point 542. As shown in FIG. 5, the current driver supplies current at the target average current value 522, and with a ripple current that is reduced over time to implement the target peak current set-point 542. The reduced ripple current over time corresponds to an off-time that is also reduced over time, to the value between later switch-off time 512 and later switch-on time 514. The control logic of the current controller may thus control the load current 562 to, e.g., an LED chain 290, with precision control of brightness and color, no perceptible flicker, with low ripple current and high efficiency, and with a small and low-cost device.

Figure 6:
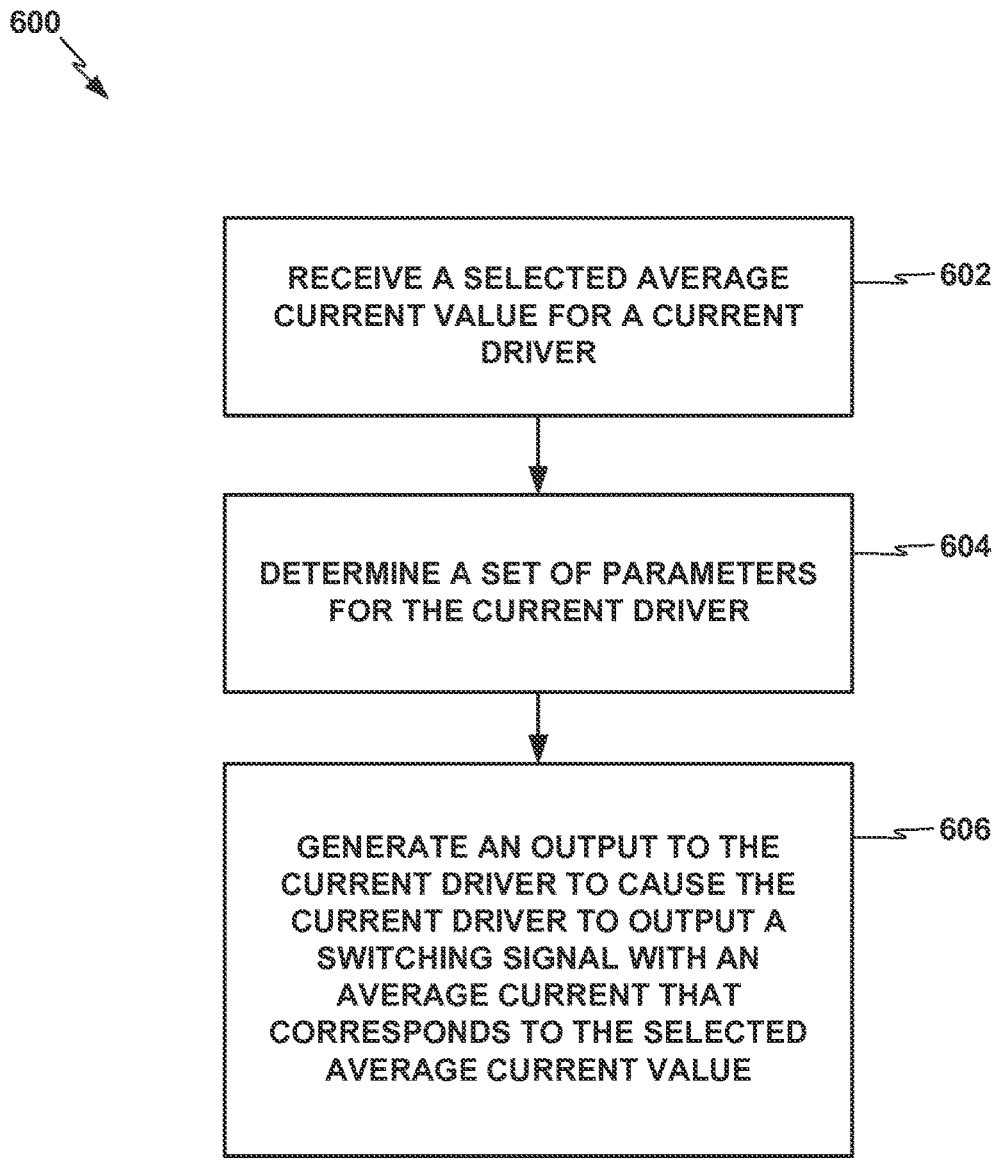
FIG. 6 depicts a flowchart illustrating a method for automated implementation of a selected average output current based on a measured input voltage and a measured load voltage, in accordance with an example of this disclosure.

FIG. 6 depicts a flowchart illustrating a method 600 for automated implementation of a selected average output current based on a measured input voltage and a measured load voltage, in accordance with an example of this disclosure. Method 600 may be performed by control logic unit 120 or 220, CPU 320, or FPGA 420, and may result in a current driver outputting a switching signal with the target average current and with low ripple current, as described above with reference to FIGS. 1-5.

Method 600 includes receiving a selected average current value for a current driver (e.g., control logic units 120, 220, CPU 320. FPGA 420 receiving target average current value 122, 222, 422, 522, and/or as in 301) (602). Method 600 further includes determining a set of parameters for the current driver (e.g., measuring or determining an input voltage, an inductor voltage, a load forward voltage, an inductance, and/or an internal propagation time, as described above) (604). Method 600 further includes generating an output to the current driver to cause the current driver to output a switching signal with an average current that corresponds to the selected average current value (e.g., generating outputs for at least one of a target peak current set-point, a ripple current, and a target off-time, as described above) (606).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), application-specific integrated circuits (ASICs), programmable logic devices (PLDs), complex programmable logic devices (CPLDs), virtual devices executed by one or more underlying computing devices, or any other configuration of hardware and/or software.

Various illustrative aspects of the disclosure may be implemented as in the following examples, numbered A1-A20:

A1. A device configured to: receive a selected average current value for a current driver; determine a set of parameters for the current driver; and generate an output to the current driver to cause the current driver to output a switching signal with an average current that corresponds to the selected average current value.

A2. A device of example A1, wherein determining the set of parameters for the current driver comprises measuring an input voltage.

A3. A device of any combination of examples A1-A2, wherein determining the set of parameters for the current driver comprises measuring an inductor voltage.

A4. A device of any combination of examples A1-A3, wherein determining the set of parameters for the current driver comprises determining a load forward voltage based on a measured input voltage and a measured inductor voltage.

A5. A device of any combination of examples A1-A4, wherein determining the set of parameters for the current driver comprises determining an inductance.

A6. A device of any combination of examples A1-A5, wherein determining the set of parameters for the current driver comprises determining an internal propagation time.

A7. A device of any combination of examples A1-A6, wherein generating the output to the current driver comprises generating a target off-time.

A8. A device of any combination of examples A1-A7, wherein generating the output to the current driver comprises generating a target peak current set-point.

A9. A device of any combination of examples A1-A8, wherein generating the output to the current driver comprises: outputting an initial peak current reference higher than the selected average current value; determining a peak current based at least in part on an initial peak current reference and the initial current overshoot; and determining at least one of a target ripple current and a target peak current set-point based at least in part on the peak current and the target average current.

A10. A device of any combination of examples A1-A9, wherein generating the output to the current driver further comprises: determining the initial current overshoot based at least in part on an inductor voltage, an inductance, and a propagation time.

A11. A device of any combination of examples A1-A10, wherein generating the output to the current driver further comprises: determining a target off-time based at least in part on: at least one of the target ripple current and the target peak current set-point; an inductance; and a load forward voltage.

A12. A device of any combination of examples A1-A11, wherein the device is integrated in a microcontroller for controlling the current driver.

A13. A device of any combination of examples A1-A12, wherein the device is implemented as a central processing unit configured with executable software instructions.

A14. A device of any combination of examples A1-A13, wherein the device is implemented as an application-specific integrated circuit (ASIC) configured with logic-implementing circuitry hardware.

A15. A device of any combination of examples A11-A14, wherein the device is implemented as field-programmable gate array (FPGA) configured with logic-implementing circuitry hardware.

A16. A method comprising: receiving a selected average current value for a current driver; determining a set of parameters for the current driver; and generating an output to the current driver to cause the current driver to output a switching signal with an average current that corresponds to the selected average current value.

A17. A method of example A16, wherein generating the output to the current driver comprises: outputting an initial peak current reference higher than the selected average current value; determining a peak current based at least in part on an initial peak current reference and the initial current overshoot; and determining at least one of a target ripple current and a target peak current set-point based at least in part on the peak current and the target average current.

A18. A method of any combination of examples A16-A17, wherein generating the output to the current driver further comprises: determining the initial current overshoot based at least in part on an inductor voltage, an inductance, and a propagation time.

A19. A method of any combination of examples A16-A18, wherein generating the output to the current driver further comprises: determining a target off-time based at least in part on: at least one of the target ripple current and the target peak current set-point; an inductance; and a load forward voltage.

A20. A microcontroller comprising: a pulse density modulator; an analog comparator; a current control circuit having an input connected to an output of the pulse density modulator and to an output of the analog comparator; and a logic control unit, wherein the logic control unit is configured with a peak current set-point output connected to an input of the analog comparator, and with an off-time output connected to an input of the current control unit.

Various examples have been described. These and other examples are within the scope of the following claims.

What is claimed is:

1. A device configured to:
   receive a selected average current value for a current driver;
   determine a set of parameters for the current driver; and
   generate an output to the current driver to cause the current driver to output a switching signal with an average current that corresponds to the selected average current value,
   wherein, to determine the set of parameters for the current driver, the device is configured to determine a load forward voltage based on a measured input voltage and a measured inductor voltage.

2. The device of claim 1, wherein, to determine the set of parameters for the current driver, the device is configured to measure the input voltage.

3. The device of claim 1, wherein, to determine the set of parameters for the current driver, the device is configured to measure the inductor voltage.

4. The device of claim 1, wherein, to determine the set of parameters for the current driver, the device is configured to determine an inductance.

5. The device of claim 1, wherein, to determine the set of parameters for the current driver, the device is configured to determine an internal propagation time.

6. The device of claim 1, wherein, to generate the output to the current driver, the device is configured to generate a target off-time.

7. The device of claim 1, wherein, to generate the output to the current driver, the device is configured to generate a target peak current set-point.

8. The device of claim 1, wherein, to generate the output to the current driver, the device is configured to:
   output an initial peak current reference higher than the selected average current value;
   determine a peak current based at least in part on an initial peak current reference and an initial current overshoot; and
   determine at least one of a target ripple current and a target peak current set-point based at least in part on the peak current and the target average current.

9. The device of claim 8, wherein, to generate the output to the current driver, the device is configured to:
   determine the initial current overshoot based at least in part on the inductor voltage, an inductance, and a propagation time.

10. The device of claim 8, wherein, to generate the output to the current driver, the device is configured to:
    determine a target off-time based at least in part on: at least one of the target ripple current and the target peak current set-point; an inductance; and the load forward voltage.

11. The device of claim 1, wherein the device is integrated in a microcontroller for controlling the current driver.

12. The device of claim 1, wherein the device is implemented as a central processing unit configured with executable software instructions.

13. The device of claim 1, wherein the device is implemented as an application-specific integrated circuit (ASIC) configured with logic-implementing circuitry hardware.

14. The device of claim 1, wherein the device is implemented as field-programmable gate array (FPGA) configured with logic-implementing circuitry hardware.

15. A method comprising:
    receiving a selected average current value for a current driver;
    determining a set of parameters for the current driver; and
    generating an output to the current driver to cause the current driver to output a switching signal with an average current that corresponds to the selected average current value;
    wherein generating the output to the current driver comprises:
    outputting an initial peak current reference higher than the selected average current value;
    determining a peak current based at least in part on an initial peak current reference and an initial current overshoot; and
    determining at least one of a target ripple current and a target peak current set-point based at least in part on the peak current and the target average current.

16. The method of claim 15, wherein generating the output to the current driver further comprises:

determining the initial current overshoot based at least in part on an inductor voltage, an inductance, and a propagation time.

17. The method of claim 15, wherein generating the output to the current driver further comprises:

determining a target off-time based at least in part on: at least one of the target ripple current and the target peak current set-point; an inductance; and a load forward voltage.

* * * * *